(12) United States Patent
Gilbert et al.

(10) Patent No.: US 7,352,860 B2
(45) Date of Patent: Apr. 1, 2008

(54) METHOD OF ENCIPHERMENT BY PERMUTATIONS OF FIXED-LENGTH SEQUENCES

(75) Inventors: Henri Gilbert, Bures-sur-Yvette (FR); Gilles Macario-Rat, Vanves (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 849 days.

(21) Appl. No.: 10/736,752

(22) Filed: Dec. 16, 2003

(65) Prior Publication Data
US 2004/0146162 A1 Jul. 29, 2004

(30) Foreign Application Priority Data
Dec. 17, 2002 (FR) .................................... 02 15985

(51) Int. Cl.
*H04L 9/00* (2006.01)
(52) U.S. Cl. ...................................................... 380/28
(58) Field of Classification Search .................. 380/28
See application file for complete search history.

(56) References Cited

FOREIGN PATENT DOCUMENTS

| EP | 0 759 669 A2 | 8/1996 |
|---|---|---|
| EP | 0759669 A2 * | 2/1997 |

OTHER PUBLICATIONS

Menezes et al., "Handbook of Applied Cryptography", CRC Press Series on Discrete Mathematics and its Applications, CRC press, pp. 6-10, 15-20, 241-244, 1997.

James L. Massey et al., "Non-expanding, key-minimal, robustly-perfect, linear and bilinear ciphers", Advances in Cryptology—Eurocrypt '87, Springer-Verlag, pp. 237-247, Apr. 1987.

A. A. Moldovyan et al., "A Cipher Based on Data-Dependent Permutations", Journal of Cryptology, Springer-Verlag, vol. 15, No. 1., pp. 61-72, Dec. 1, 2002.

* cited by examiner

*Primary Examiner*—Kambiz Zand
*Assistant Examiner*—Peter Poltorak
(74) *Attorney, Agent, or Firm*—Cohen Pontani Lieberman & Pavane

(57) ABSTRACT

A method of enciphering information constituted by a finite sequence $\{S_1,S_2,\ldots,S_N\}$ of N symbols $(S_1,S_2,\ldots,S_N)$ selected from an alphabet A. There are defined both a secret convention of p key symbols $K_1,\ldots,K_p$ selected form a second alphabet B, and a multivariate function M having m+1 variables (m<=N): $M(X_{i1},\ldots,X_{im},Y)$ operating $A^m \square B$ in A, $\{i_1,\ldots,i_m\}$ being m distinct indices in the range [1,N] and the function M being bijective relative to at least one $(X_{i1})$ of the m variables of A. A succession of X permutations are performed on the sequences $\{S_1,S_2,\ldots,S_N\}$ such that where $\{S_1,S_2,\ldots,S_N\}$ is the sequence prior to the $j^{th}$ permutation, the sequence after the $j^{th}$ permutation is $\{S_2,S_3,\ldots,S_N,Zj\}$, where Zj is equal to $M(S_{i1},\ldots,S_{im},K_j)$ the enciphered information being constituted by the sequence $\{S'_1,S'_2,\ldots,S'_N\}$ obtained after the $X^{th}$ permutation.

2 Claims, 2 Drawing Sheets t(S2,S3)=S4

METHOD OF ENCIPHERMENT BY PERMUTATIONS OF FIXED-LENGTH SEQUENCES

FIELD OF THE INVENTION

The present invention involves the field of processing information, and more particularly the field of enciphering information using symmetrical secret key cryptography, as opposed to asymmetrical public key cryptography. The present invention relates to a method of enciphering information constituted by a finite sequence of N symbols selected from an alphabet.

BACKGROUND OF THE INVENTION

It often happens that there is a need to encipher information constituted by a finite sequence of symbols belonging to a finite alphabet, and that it is desired that the enciphered information itself be represented in the same alphabet and be of the same length as the initial sequence in the clear, i.e., the original information to be enciphered. This need is felt, for example, in respect of telephone numbers, virtual prepaid card numbers, bank card numbers, or indeed alphanumeric license plate numbers. In the first three cases mentioned above, the alphabet is constituted by the digits 0 to 9, whereas in the last case it is constituted by upper and lower case letters and digits.

SUMMARY OF THE INVENTION

It is an object of the present invention to provide an enciphering method based on constructing enciphering functions that can be referred to as "overall permutations of fixed-length sequences over a finite set of symbols", and to satisfy the above-specified need regardless of the particular finite set of symbols and regardless of the fixed length of the sequences.

Secret key cryptography involves designing and studying functions based on a secret convention that enables two parties sharing knowledge of the secret convention to perform the two operations referred to as "enciphering" and "deciphering". This includes the following:

for enciphering, transforming data D into data C; and
for deciphering, transforming the above data C into the data D.

These operations are conditional on the following:

the data C can be transformed into the data D only through knowledge of the secret convention; and
knowledge of C and D, or of a large number of {C, D} pairs, does not enable the secret convention to be discovered.

Numerous known secret key enciphering algorithms are in existence, and many of them are standardized, such as DES, 3DES, ADES, IDEA, BLOWFISH, RC2, RC4, etc.

Most of those algorithms are used for enciphering binary sequences, independently of the semantic meaning of the bits, and they therefore require the information for enciphering to be transformed into a binary code. The resulting enciphered information is likewise represented by a binary sequence.

There exist several methods of enciphering that usually require enciphering to be applied to binary blocks of fixed size. The several methods for enciphering differ from each other by the way synchronization (i.e. the way the method for enciphering is run in terms of time schedule from the block in the clear to the enciphered block) is performed between a block in the clear and an enciphered block; for example: reinjecting an enciphered block to encipher the following blocks, dictionary of independently enciphered blocks, etc.

Nevertheless, those known enciphering techniques present various drawbacks:

a) When it is desired to encipher independent data, in small quantities, existing tools lead to the information being expanded, either to comply with the format for representing the enciphered information, or in order to make diversification keys (initialization vectors) available that are suitable for guaranteeing security of the encipherment. Thus, for example, enciphering a text made up of printable characters (ASCII characters in particular) yields a binary sequence, and it must be expanded in order to be able to represent the enciphered text in the form of printable characters.

b) With existing tools, the constraint of complying with the format of the information to be enciphered and with the format of the enciphered information leads to loss of the format of the data being enciphered in the clear. This applies in particular to enciphering numerical identifiers, which are generally representable by a serial number (e.g. a credit card number) that has the property of being smaller than some maximum value, and leads to an enciphered result that no longer has that property.

Thus, a technical problem to be solved by the subject matter of the present invention is to provide a method of enciphering information constituted by a finite sequence $\{S_1, S_2, \ldots, S_N\}$ of N symbols selected from an alphabet A, which method enables a sequence of fixed length to be enciphered while avoiding the above-mentioned drawbacks of the prior art.

According to the present invention, the solution to the technical problem posed above is that there are defined both a secret convention of p key symbols $K_1, \ldots, K_p$ selected from a second alphabet B, and a multivariate function M having m+1 variables (m<=N): $M(X_{i1}, \ldots, X_{im}, Y)$ operating $A^m \times B$ in A, $\{i_1, \ldots, i_m\}$ being m distinct indices in the range [1,N] and the function M being bijective relative to at least one $(X_{i1})$ of the m variables of A. The enciphering method performs a succession of X permutations on the sequences $\{S_1, S_2, \ldots, S_N\}$ such that where $\{S_1, S_2, \ldots, S_N\}$ is the sequence prior to the $j^{th}$ permutation, the sequence after the $j^{th}$ permutation is $\{S_2, S_3, \ldots, S_N, Z_j\}$, where $Z_j$ is equal to $M(S_{i1}, \ldots, S_{im}, K_j)$ the enciphered information being constituted by the sequence $\{S'_1, S'_2, \ldots, S'_N\}$ obtained after the $X^{th}$ permutation.

In the text set forth below, the term "symbol" is used to mean an individual unit of information used to represent words, numbers, names, etc. Examples of symbols are: bits; bytes; printable characters; digits; etc.

Similarly, the term "alphabet" is used to mean a set of symbols sharing a common property, for example concerning format, size, etc., which together serve to represent a certain category of information. As alphabets, mention can be made of the 7-bit characters defined by ASCII code, the digits 0 to 9, and displayable characters.

A function is said to be "multivariate" when it takes a plurality of input arguments, which arguments may be of the same kind or of different kinds. Addition is an example of a multivariate function. In the context of the invention, the multivariate function M takes as its input m symbols $S_{i1}, \ldots, S_{im}$ and a value $K_j$ of the key symbol of the secret convention K, and it outputs a symbol Zj belonging to the same alphabet A as the symbols $S_i$: $Z_j = M(S_{i1}, \ldots, S_{im}, K_j)$.

The multivariate function M is said to be "bijective" relative to one of its variables if, all other variables remaining fixed, the function restricted to this coordinate is bijective. In the description below, the case is considered where the function $M(X_{i1}, \ldots, X_{im}, Y)$ is bijective relative to the first variable ($X_{i1}$).

In a particular implementation of the method of the invention in which the number m is equal to 3, the function M defined by $Z=M(X_1, X_2, X_N, Y)$ is calculated in the following steps;

$$U=t1(X_1, X_N)$$

$$V=t2(U, Y)$$

$$Z=t1(V, X_2)$$

t1 and t2 being the functions associated with two Latin squares T1 and T2 of size equal to the cardinal number of the set A.

The term "Latin square" of size N designates a table T of N×N positions containing N distinct symbols (S1, ..., SN) of an alphabet A and such that each row and each column of the table contains each symbol once, and once only. An example of a Latin square of size 4 is given in FIG. 5.

By extension, and assuming that the symbols of the alphabet A are ordered, i.e. numbered 1 to N, a "Latin square" function t associated with the Latin square T is defined as follows: t(Si,Sj) is the symbol contained in the position situated at the intersection of the $i^{th}$ row and the $j^{th}$ column.

The multivariate function t defined in this way is bijective relative to each of its variables.

The "left inverse" $T*^l$ and the "right inverse" $T*^r$ of a Latin square and the corresponding associated functions $t*^l$ and $t*^r$ are defined by the following properties:

for all Y and X, $t(t*^l(X,Y),Y)=X$;

for all Y and X, $t(X,t*^r(X,Y),Y)=Y$.

DETAILED DESCRIPTION OF THE DRAWINGS

Figure 1:
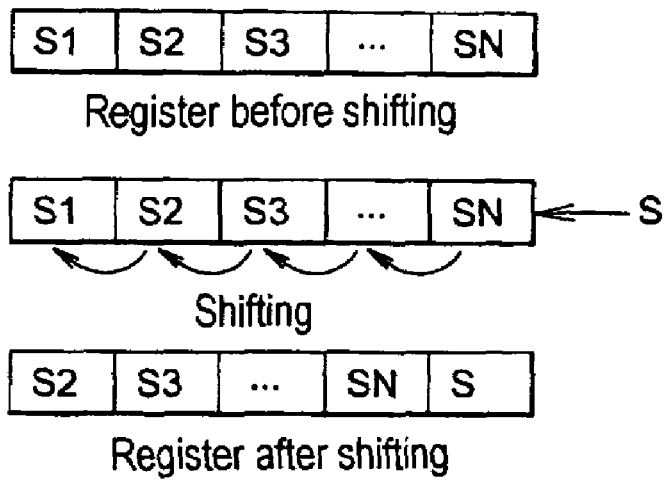
FIG. 1 is a diagram showing the mechanism of a shift register.

FIG. 1 shows a shift register of length N made up of an ordered set of N positions containing N optionally distinct symbols of an alphabet A, namely $S_1, S_2, \ldots, S_N$.

The register of FIG. 1 possesses a so-called "shift" mechanism which, starting with a new symbol, stores this new symbol in the last position and stores the symbol previously present in each position i in each respective position j−1. Consequently, the symbol $S_1$ previously present in the first position is forgotten.

In the context of the invention, the N symbols constituting the information to be enciphered are initially disposed in the N positions of the shift register of FIG. 1.

In the method of the invention, there are defined both a secret convention K consisting in a sequence of e key symbols $K_1, \ldots, K_p$ selected from a second alphabet B with p preferably being sufficiently large, and also a multivariate function M having m+1 variables (m<=N): $M(X_{i1}, \ldots, X_{im}, Y)$ operating $A^m \times B$ in A, $\{i_1, \ldots, i_m\}$ being m distinct indices in the range [1,N].

In addition, the function M is taken to be bijective relative to its first variable $X_{i1}$.

Figure 2:
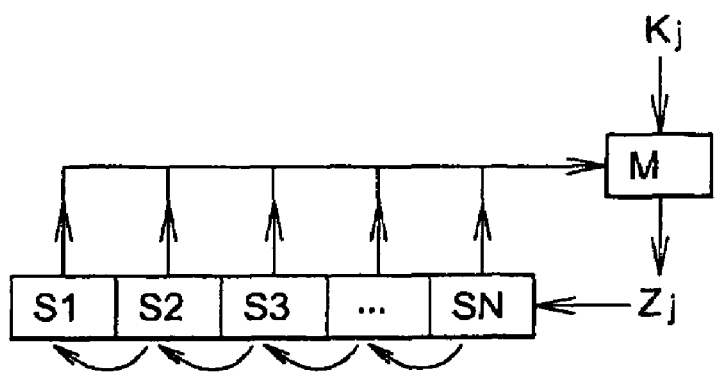
FIG. 2 is a diagram showing the mechanism of a first implementation of the method in accordance with the invention.

In a general implementation of the enciphering method of the invention, as shown in FIG. 2, the number m is equal to N: ($\{i_1, \ldots, i_m\}=\{1, \ldots, N\}$).

The result of the $J^{th}$ turn of the shift register is then written $Zj=M(S_1, \ldots, S_N, K_j)$. If $\{S_1, S_2, \ldots, S_N\}$ is the state of the shift register prior to the $J^{th}$ turn, then the state of the shift register after the $J^{th}$ turn and before the $J+1^{th}$ turn becomes $\{S_2, S_3, \ldots, S_N, Z_j\}$.

The enciphering method performs X turns of the shift register where X is preferably greater than several times N. The state of the shift register before the first turn constitutes the information in the clear. The state of the shift register after the $X^{th}$ turn constitutes the enciphered information.

Figure 3:
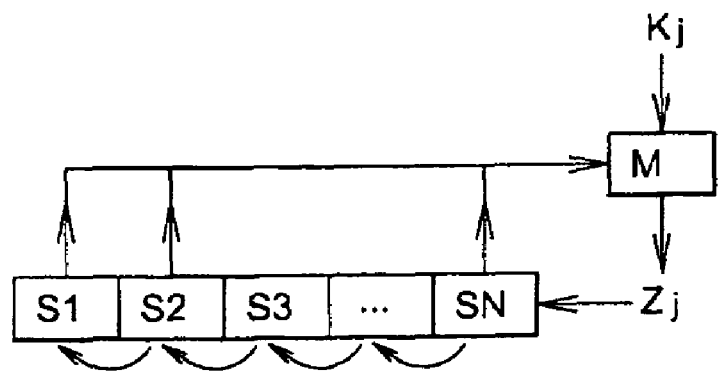
FIG. 3 is a diagram showing the mechanism of a second implementation of the method in accordance with the invention.

In a variant of the method of the invention, the number m is taken to be less than N, e.g. 3, and the function M is defined by $M(X_1, X_2, X_N, Y)$ as shown in FIG. 3: $\{i_1, i_2, i_3\}=\{1,2,N\}$. The result Zj of the $J^{th}$ turn of the shift register is given by $Zj=M(S_1, S_2, S_N, K_j)$.

By way of example, a particular implementation of this variant embodiment selects for the alphabet A the set of digits 0 to 9.

The length N of sequences $\{S_1, S_2, \ldots, S_N\}$ can take various values in the range about 6 to 16, e.g. N=14. Naturally any other value could be envisaged.

The shift register is thus of size N=14.

The secret convention K is constituted by a sequence of p=12 digits, e.g.: K1, ..., K12. If the number X of turns of the shift register is greater than p, then K13=K1, K14=K2, etc.

T1 and T2 are two Latin squares of size N=10 using the alphabet A, and t1 and t2 are the associated functions.

The function M takes as its arguments three of the positions of the shift register: the first position X1, the second position X2, and the last X14. $Zj=M(S_1, S_2, S_N, K_j)$ is calculated with a key symbol $K_j$ selected from the secret convention K.

$M(X1, X2, X14, Y)=Z$ is calculated by the following steps:

$$U=t1(X1, X14)$$

$$V=t2(U, Y)$$

$$Z=t1(V, X2)$$

After X=100 turns of the shift register, for example, the initial information in enciphered form is obtained which is written in the following text in the form of the sequence $\{S'_1, S'_2, \ldots, S'_N\}$.

Figure 4:
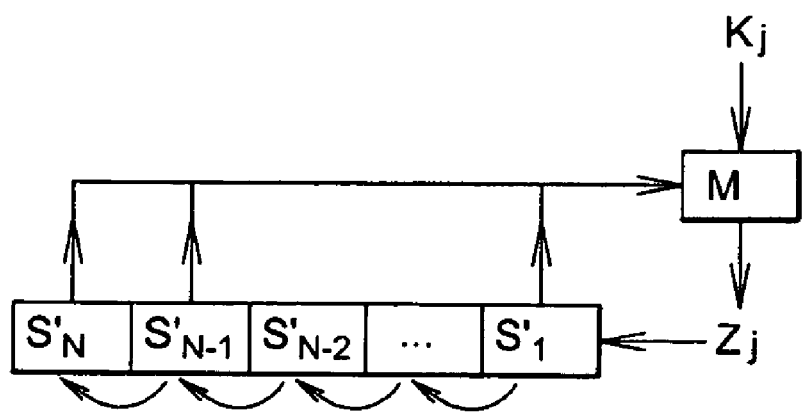
FIG. 4 is a diagram showing the deciphering mechanism associated with the enciphering mechanism of FIG. 3.
Figure 5:
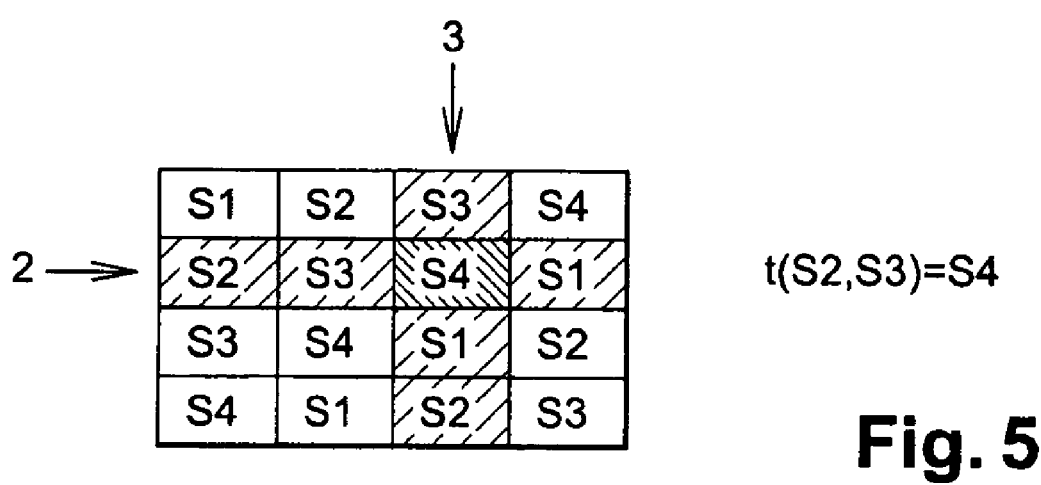
FIG. 5 shows an example of a Latin square of size 4.

As shown in FIG. 4, the function for deciphering the enciphered information $\{S'_1, S'_2, \ldots, S'_N\}$ is constructed as follows:

On input, the shift register is loaded with the enciphered data in reverse order, symbol $(S'_N, S'_{N-1}, \ldots, S'_1)$ The inverse function "$M^{-1}$" of M relative to the first coordinate takes as its arguments three positions of the shift register: the first position X1, the second X2, and the last X14. $Zj=M(S_1, S_2, S_N, K_j)$ is calculated with a key symbol Kj, beginning with the symbol last used during enciphering and subsequently in decreasing order on the following turn Kj-1 is used.

M(X1,X2,X14,Y)=Z is calculated using the following steps:

$$V=t1*^l(X1,X14)$$

$$U=t2*^l(V,Y)$$

$$Z=t1*^l(U,X2)$$

The register is then shifted in the same manner as for the enciphering function, the $14^{th}$ position taking the value Zj.

100 turns are performed in this way on the shift register.

At the end of these 100 turns, the register contains the information in the clear $\{S_1,S_2,\ldots,S_N\}$.

It will be understood that an advantage of this method is that the enciphering function and the deciphering function have the same scheme.

We claim:

1. A method of enciphering information constituted by a finite sequence $\{S_1,S_2,\ldots,S_N\}$ of N symbols $\{S_1,S_2,\ldots,S_N\}$ selected from an alphabet A, wherein there are defined both a secret convention (K) of p key symbols $K_1,\ldots,K_p$ selected from a second alphabet B, and a multivariate function M having m+1 variables (m<=N): $M(X_{i1},\ldots,X_{im},Y)$ operating $A^m \times B$ in A, $\{i_1,\ldots,i_m\}$ being m distinct indices in the range [1,N] and the function M being bijective relative to at least one $(X_{i1})$ of the m variables of A, said enciphering method comprising:

initially placing the N symbols $S_1,S_2,\ldots,S_N$ constituting the information to be enciphered in the N positions of a shift register, and then performing a succession of X turns of the shift register implementing a succession of X permutations on the sequences $\{S_1,S_2,\ldots,S_N\}$ such that where $\{S_1,S_2,\ldots,S_N\}$ is the sequence prior to the $j^{th}$ permutation, the sequence after the $j^{th}$ permutation is $\{S_2,S_3,\ldots,S_N,Zj\}$, where Zj is equal to $M(S_{i1},\ldots,S_{im},K_j)$, the enciphered information being constituted by the sequence $\{S'_1,S'_2,\ldots,S'_N\}$ contained in the shift register at the end of the $X^{th}$ permutation resulting from the $X^{th}$ turn of the shift registers, wherein the number X of permutations is greater than several times the length N of the sequences $\{S_1,S_2,\ldots,S_N\}$, wherein the number m is equal to 3, the function M being defined by $M(X_1,X_2,X_N,Y)$, and wherein the function $M(X_1,X_2,X_N,Y)$ is calculated using the following steps:

$$U=t1(X_1,X_N)$$

$$V=t2(U,Y)$$

$$Z=t1(V,X_2)$$

t1 and t2 being the functions associated with two Latin squares T1 and T2 of size equal to the number N.

2. A method of deciphering information enciphered using the enciphering method of claim 1, wherein the symbols $(S'_1,S'_2,\ldots,S'_N)$ of the sequence $\{S'_1,S'_2,\ldots,S'_N\}$ constituting the enciphered information are reverse symbol by symbol $(S'_N,S'_{N-1},\ldots,S'_1)$, $M(S_1,S_2,S_N,K_j)=Zj$ is calculated using a key symbol Kj beginning with the last key symbol to be used during enciphering, and so on in decreasing order ... Zj,Zj-1, ..., with $M(X_1,X_2,X_N,Y)=Z$ being calculated using the following steps:

$$V=t1*\square(X_1,X_N)$$

$$U=t2*\square(V,Y)$$

$$Z=t1*\square(U,X_2)$$

the sequence obtained at the end of the $X^{th}$ permutation reconstituting the information in the clear $\{S_1,S_2,\ldots,S_N\}$.

* * * * *